March 9, 1965   C. B. KEPHART, JR   3,172,307
CHAIN SAW SHARPENING DEVICE
Filed March 30, 1964

INVENTOR
CHARLES B. KEPHART, JR.
BY Dick & Zarley
ATTORNEYS

United States Patent Office 3,172,307
Patented Mar. 9, 1965

3,172,307
CHAIN SAW SHARPENING DEVICE
Charles B. Kephart, Jr., 1620 18th St.,
West Des Moines, Iowa
Filed Mar. 30, 1964, Ser. No. 355,808
4 Claims. (Cl. 76—36)

This invention relates to chain saw sharpening devices and specifically to devices for filing the teeth of chain saws.

This application is a continuation-in-part of application, Serial No. 333,375, filed December 26, 1963.

One of the objects of this invention is to provide a chain saw sharpening device having a file holder which will firmly grip the saw-tooth being sharpened.

An object of this invention is to provide a file holder which will positively hold the file unit at the desired angle relative to the saw-tooth.

Another object of this invention is to provide a chain saw sharpening device having a file holder which may be quickly and readily secured to and removed from the longitudinal edge of a chain saw.

A still further object of this invention is to provide a chain saw sharpening device having a file unit which has handle portions for conveniently moving the file unit along the cutting edge of the saw-teeth.

Another object of this invention is to provide a chain saw sharpening device including a file holder which is normally spring biased into locking engagement with the chain saw. Also, means is contemplated for quickly releasing the file holder from the chain saw for movement therealong or removal therefrom.

A still further object of this invention is to provide cushion means for clampingly engaging the longitudinal portion of the chain saw.

A still further object of this invention is to provide a support means for a file tool which will positively hold the file tool at the desired angle to the saw tooth even if, after extensive use the file support has worn considerably. Also, the file support member permits quick removal of the file tool from the saw sharpening device.

Therefore, it is an object of this invention to provide a chain saw sharpening device having a file holder which positively retains the file tool in the desired position throughout its use thereby enabling precision filing of the chain saw teeth.

A further object of this invention is to provide a chain saw sharpening device which is simple in design, economical to manufacture and refined in appearance.

This invention consists in the construction, arrangements, and combination of the various parts of the device, whereby the objects contemplated are attained as hereinafter more fully set forth, specifically pointed out in the claims, and illustrated in the accompanying drawings, in which:

Figure 1:
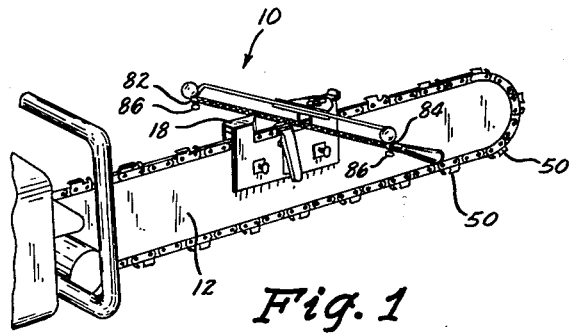
FIG. 1 is a perspective view of the chain saw with the chain saw sharpening device mounted thereon.
Figure 4:
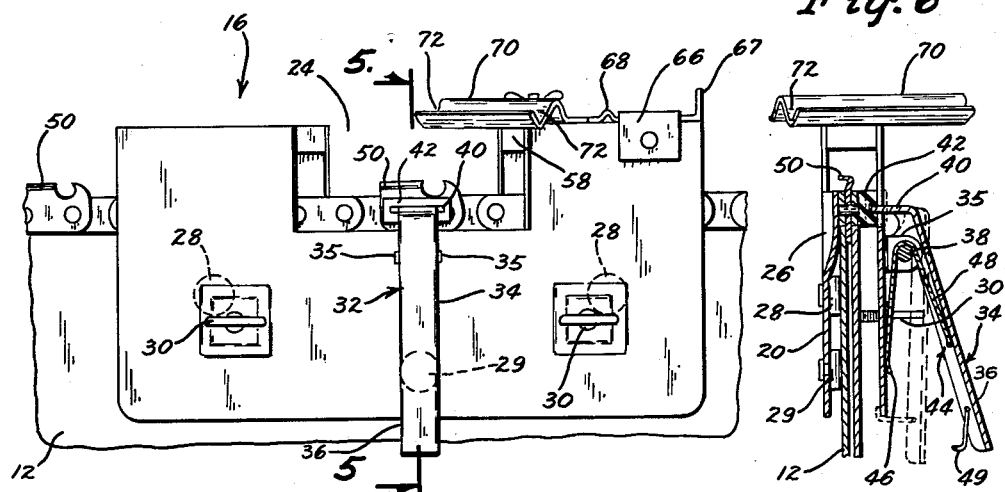
FIG. 4 is a side elevation view of the chain saw sharpening device in FIG. 3.

The saw sharpening device of this invention is referred to generally by the reference numeral 10 in FIG. 1 of the drawings and is shown mounted on the longitudinal edge of the chain saw bar guide 12. A file tool 14 is included in the sharpening device 10 and is slidably and rotatably secured to a saw tooth holder assembly 16 as shown in FIG. 4.

Figure 5:
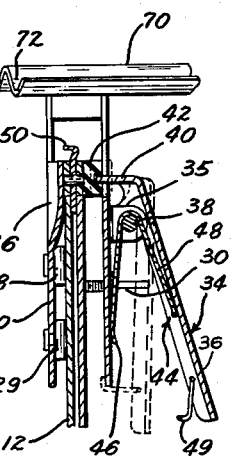
FIG. 5 is an end elevation view of the chain saw sharpening device of FIG. 4.

The file holder 16 is comprised of an inverted U-shaped channel member having a base 18 and opposite side walls 20 and 22. A section of the base 18 and the side walls 20 and 22 have been removed intermediate the ends of the channel and thereby form an opening or recess 24 through the channel. A portion 26 of the wall 20 has been swaged inwardly into the opening 24 and extends longitudinally substantially the length of the opening. As shown in FIG. 5, circular rubber cushion elements 28 are provided on opposite sides of the opening 24 on the inside of wall 20 and extend inwardly towards the opposite channel wall 22. To provide three point bearing support for the file holder 16, a third rubber cushion 29 is provided on the inside face of wall 20 below and between the cushion elements 28.

A pair of thumb screws 30 (FIG. 4) are threadably secured in the wall 22 opposite each of the cushion elements 28 and are adapted to engage the bar 12 of the chain saw thereby securely clamping it between the swage portion 26, the cushions 28 and 29 and the thumb screws 30.

Between the thumb screws 30 and adjacent the opening 24, a finger assembly 32 is mounted on the side wall 22 in a plane extending transversely to the longitudinal axis of the saw holder assembly 16. The finger assembly 32 includes a finger member 34 which is pivotally connected in a vertical plane between a pair of support plates 35 35 by a bolt 38. The lower free end of the finger member 34 serves as a handle 36. A plunger portion 40 is provided above the support elements 35 and is adapted to move into the opening 24, upon pivoting of the finger member 34, where it will be in direct alignment with the swage portion 26 in the opposite wall 20. The plunger portion 40 is provided with a rubber cushion cap element 42. The plunger portion 40 on the finger member 34 is normally biased into the opening 24 by a spring 44 which is coiled at its intermediate portion around the bolt 38 and has free end portions 46 and 48 which bear against the side wall 22 and the inside surface of the handle portion 36 respectively. Also, a hook latch element 49 is pivotally secured to the handle portion 36 and is adapted to lockingly engage the lower longitudinal edge of the channel wall 22 to hold the plunger portion 40 on the finger 34 out of the opening 24 in the holder 16.

Thus it is seen that by the proper placement of the file holder channel 16 on the saw bar 12, a saw tooth 50 may be clamped between the swage portion 26 and the plunger 40. As shown in FIG. 4, the cap cushion 42 on the plunger 40 engages substantially the full length of the tooth 50 along its lower area below its cutting edges.

Figure 3:
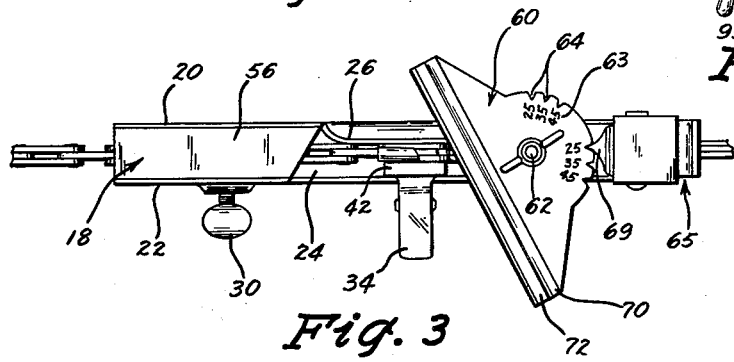
FIG. 3 is a top plan view enlarged, showing in detail the chain saw sharpening device.

By forming the opening 24 in the file holder 16, two base portions 56 and 58 are provided on opposite sides thereof. A similar semicircular protractor plate member 60 which serves to slidably support the file tool 14 is rotatably mounted by a bolt 62 to the base portion 58 (FIG. 4). The rounded edge of the protractor is provided with angle markings 63 and corresponding to each of these markings, a V-shaped notch 64 is formed in the rounded peripheral edge of the protractor 60. The notches 64 are disposed along a circular line concentric about the bolt 62. Outwardly of the protractor 60, an indicator unit 65 is provided slidably secured to the base portion 58 by a U-shaped clamp element 66 connected to each of the side walls 20 and 22. A finger engaging portion 67 is formed on the outer free end of the indicator 65 and a rounded shoulder 68 is formed on the opposite side of the U-shaped clamp 66 to prevent the indicator from being pulled completely out from under the U-shaped clamp 66 by the finger engaging portion 67. On the inner end of the indicator 65 adjacent the protractor 60, a pointer 69 is provided for selective engagement with one of the V-shaped notches 64 (FIG. 3).

Along the edge of the protractor 60 extending over the opening 24, a raised shoulder 70 is provided which terminates in a V-shaped in cross-section notch 72 which extends the full length of the protractor 60.

Figure 2:
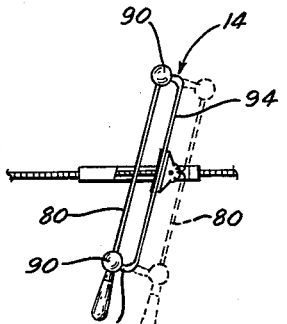
FIG. 2 is a reduced in size top plan view of the chain saw sharpening device mounted on a chain saw showing in particular the file tool in two alternate positions.
Figure 6:
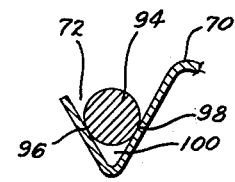
FIG. 6 is a cross-sectional view of the protractor file tool support member carried on the chain saw sharpening device showing in particular the relationship between the file tool frame and the frame receiving groove on the file tool support member.

The file unit 14 includes an elongated round file element 80 provided with collar elements 82 and 84 at each of its ends. Thumb screws 86 are threadably received in the lower side of the collars and are adapted to engage the file element 80 to hold it against movement relative to the collars. A knob 90 is secured on the top end of each of the collars 82 and 84. A frame support rod 94 cylindrical in cross-section extends in parallel spaced relationship to the file element 80 and is secured to the collars 82 and 84 at each of its ends by leg elements 95. Thus, it is seen in FIG. 6, the support rod 94 is disposed in the V-shaped groove 72 and is supported by the side walls thereof. The side walls of the groove 72 are in line contact at 96 and 98 with the rod 94. The bottom side of the rod 94 and the base of the groove 72 define a space 100 extending the full length of the groove 72. Thus, as the file tool unit 14 is slidably moved back and forth in the groove 72 it will tend to wear the side walls thereof but always maintain only line contact therewith as it moves downwardly in the groove reducing the volume of the space 100. Accordingly the file unit 14 is positively held against transverse movement relative to its longitudinal axis but is permitted to freely move longitudinally within the groove 72. It is obvious that should it be desired to remove the file unit 14 it may be accomplished by simply lifting it upwardly out of the groove 72. However, it may be pivoted out of the opening 24 to its dash line position as shown in FIG. 2.

To set the protractor 60 at its desired angle for sharpening the saw teeth 50, it is first required that the thumb screw on the bolt 62 be loosened and the indicator 65 moved longitudinally of the holder 16 outwardly by the finger engaging means 67. The protractor 60 is then rotated to its desired position with the pointer 69 in mating engagement with the appropriate V-shaped notch 64. With the pointer 69 holding the protractor 60 against rotational movement, the thumb screw on the bolt 62 is tightened to positively hold the protractor 60 against any accidental movement.

In FIG. 5 of the drawings it is seen that the cushions 28 and 29 extend into the channel substantially the same distance as the inside face of the swage portion 26 thereby holding the holder 16 in a perfectly vertical position on the chain saw bar 12. The holder 16 may be moved along the bar 12 to the desired teeth 60 by simply depressing the finger 32 towards the channel wall 22 thereby moving the plunger 40 out of the opening 24. Once the holder 16 has been secured to the saw bar 12 by tightening the thumb screws 30, the latch 49 is disengaged by the operator's finger and the cushion 42 on the plunger 40 automatically moves into the opening 24 into engagement with the tooth 50.

Thus it is seen that with a minimum of component parts, a chain saw sharpening device has been provided which is simple and efficient to operate and capable of providing continuous precision sharpening of chain saw teeth.

Some changes may be made in the construction and arrangement of my chain saw sharpening device without departing from the real spirit and purpose of my invention, and it is my intention to cover by my claims, any modified forms of structure or use of mechanical equivalents which may be reasonably included within their scope.

I claim:

1. A file holder for use in sharpening the beveled arcuate cutting edges of chain saw teeth disposed along a longitudinal edge of a chain saw, said holder comprising, an inverted U-shaped channel member adapted to straddle said chain saw and including parallel spaced apart side walls interconnected by a channel base, with the side walls of said channel member being disposed on opposite sides of said chain saw, and the channel base being disposed adjacent the longitudinal edge thereof; said channel base and said side walls having an elongated opening formed intermediate the ends of said channel member and thereby defining a base portion at each end of said channel member, whereby a tooth on said chain saw will be exposed through said opening, means on said channel member to engage said saw tooth to hold it firmly for sharpening, a file supporting member pivotally mounted on one of said base portions at a point adjacent said opening and having a V-shaped elongated groove portion, and extending partially over said opening in said channel member, a file frame being slidably received in said V-shaped groove portion and carrying a round file in parallel spaced relation to said file frame and adapted to be moved in a longitudinal direction through the opening in said channel member, said file frame detachably resting in said V-shaped groove portion whereby said file can be simultaneously rotated and lifted into or out of engagement with the beveled arcuate cutting edge of a saw tooth firmly held within said opening.

2. The device of claim 1 wherein said V-shaped groove portion is of continuous construction.

3. The structure of claim 1 wherein said means for holding said saw tooth is comprised of a manually actuated finger member pivotally secured to the outside face of one of said side walls, a plunger portion on one end of said finger member adapted to be received in said opening in said channel member to bear against a saw tooth, bearing means on the other side wall opposite said plunger portion to bear against a saw tooth to oppose said plunger portion and thereby clamp a saw tooth therebetween, and spring means for normally pivotally biasing said finger member in one direction to move said plunger portion into said opening in said channel member.

4. The structure of claim 1 wherein a portion of one side wall of said channel member opposite to said means for holding said saw tooth is deformed inwardly towards said means, and cushion means are secured to the inside face of said one side wall of said channel member at opposite ends longitudinally thereof, and said deformed portion and said cushion means extend inwardly substantially the same distance towards the other wall of said channel member.

References Cited by the Examiner

UNITED STATES PATENTS

| 60,237 | 12/66 | Pettes | 76—31 |
| 2,459,233 | 1/49 | Mall | 76—25 |
| 2,736,216 | 2/56 | Paradis et al. | 76—25 |
| 2,818,752 | 1/58 | Granberg | 76—25 |

GRANVILLE Y. CUSTER, JR., *Primary Examiner.*